(12) United States Patent
Ohishi

(10) Patent No.: US 8,576,438 B2
(45) Date of Patent: Nov. 5, 2013

(54) DIGITAL COMPUTER AND SYSTEM FOR RECORDING INFORMATION ON OPERATIONS

(75) Inventor: Tsutomu Ohishi, Fukuoka (JP)

(73) Assignee: Ricoh Company, Ltd., Tokyo (JP)

(*) Notice: Subject to any disclaimer, the term of this patent is extended or adjusted under 35 U.S.C. 154(b) by 1503 days.

(21) Appl. No.: 11/404,920

(22) Filed: Apr. 17, 2006

(65) Prior Publication Data

US 2006/0187496 A1 Aug. 24, 2006

Related U.S. Application Data

(62) Division of application No. 10/195,390, filed on Jul. 16, 2002.

(30) Foreign Application Priority Data

Jul. 16, 2001 (JP) .................................. 2001-215929
Jul. 10, 2002 (JP) .................................. 2002-201183

(51) Int. Cl.
*G06K 15/10* (2006.01)

(52) U.S. Cl.
USPC ............................................ 358/1.8; 358/1.1

(58) Field of Classification Search
USPC ................................................. 358/401, 448
See application file for complete search history.

(56) References Cited

U.S. PATENT DOCUMENTS

| | | | | | |
|---|---|---|---|---|---|
| 5,850,545 | A | * | 12/1998 | Matsushita | 713/1 |
| 5,872,638 | A | * | 2/1999 | Haze | 358/405 |
| 5,935,262 | A | * | 8/1999 | Barrett et al. | 714/46 |
| 5,946,106 | A | * | 8/1999 | Itoh et al. | 358/442 |
| 6,031,975 | A | | 2/2000 | Iijima | |
| 6,163,383 | A | * | 12/2000 | Ota et al. | 358/1.1 |
| 6,347,335 | B1 | * | 2/2002 | Shagam et al. | 709/223 |
| 6,457,066 | B1 | * | 9/2002 | Mein et al. | 719/330 |
| 6,674,537 | B2 | * | 1/2004 | Kadowaki | 358/1.15 |
| 6,867,876 | B1 | | 3/2005 | Czyszczewski et al. | |
| 6,947,182 | B1 | * | 9/2005 | Kumagai | 358/402 |
| 2002/0030850 | A1 | * | 3/2002 | Matsueda | 358/1.15 |
| 2002/0145627 | A1 | * | 10/2002 | Whitmarsh et al. | 345/745 |
| 2003/0011801 | A1 | * | 1/2003 | Simpson et al. | 358/1.13 |
| 2003/0189717 | A1 | * | 10/2003 | Matsuda | 358/1.13 |

FOREIGN PATENT DOCUMENTS

| | | |
|---|---|---|
| JP | 11-74913 | 3/1999 |
| JP | 11-341212 | 12/1999 |
| JP | 2002-140210 | 5/2002 |
| WO | WO 01/98936 A2 | 12/2001 |

* cited by examiner

*Primary Examiner* — Umar Cheema
(74) *Attorney, Agent, or Firm* — Oblon, Spivak, McClelland, Maier & Neustadt, L.L.P.

(57) ABSTRACT

A main controller stores levels and information to be stored in accordance with the levels. An operation screen is used to enter operation information for operating a complex machine 1. A scanner engine and a plotter engine execute operations based on the operation information. A memory records only information on operations in a level corresponding to the entered level information among the operations performed by the complex machine.

11 Claims, 15 Drawing Sheets

COMPLEX MACHINE

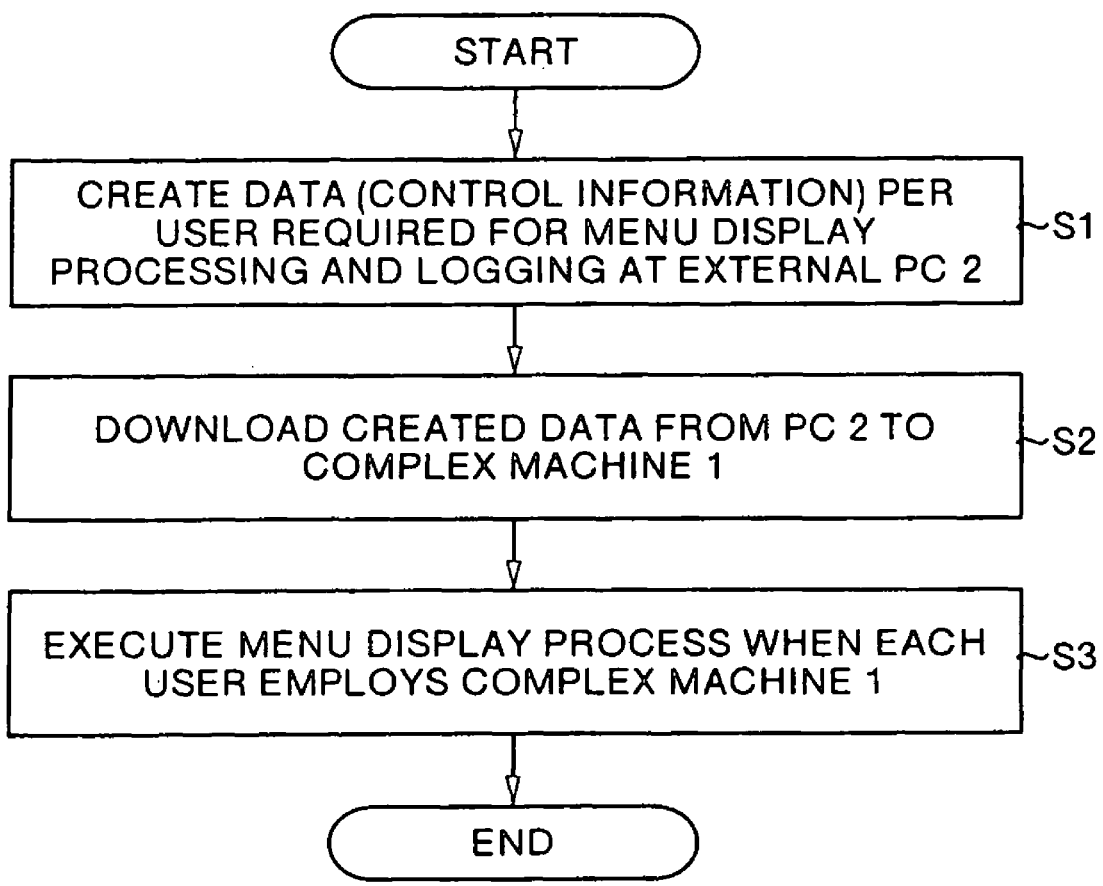

FIG.4A

INITIAL SCREEN ~1aa

| PLAN-NING | ENGI-NEERING | SALES | PUR-CHASING | QUALITY MANAGEMENT |

| USER A | USER B | USER C | USER D |

| GUEST |

PREVIOUS PAGE
NEXT PAGE
CANCEL

ENTER PASSWORD

USER : USER 1

PASSWORD : ******

OK
CANCEL

SELECT PURPOSE OF USE

| DATA | REPORT | APPLICATION |
| CONTRACT | | |

PREVIOUS PAGE
NEXT PAGE
CANCEL

SELECT DOCUMENT

| CONTRACT | TECHNICAL REPORT | PROPERTY REGISTRATION |
| | | |

PREVIOUS PAGE
NEXT PAGE
CANCEL

USER : USER 1
USE : REPORT
DOCUMENT : TECHNICAL REPORT
EFFECTIVE FUNCTION : COPY, FAX
  SELECT FUNCTION FOR USE
  | COPY | FAX | |

CANCEL

FIG.4F

EACH FUNCTION SCREEN SUCH AS COPY AND FAX

FIG.5

```
<?xml version="1.0" encoding="UTF-8"?>
<local version="0.20(2000_Sep_20)">
<screen information>
    <screen>
        <! use for initial screen>
        <summary screen number="1"/>
        <frame frame_number="1" location="+1+4" size="20×40" type="ming"/>
        <frame frame_number="2" location="+46+4" size="20×40" type="ming"/>
        <frame frame_number="3" location="+91+4" size="20×40" type="ming"/>
        <frame frame_number="4" location="+136+4" size="20×40" type="ming"/>
        <frame frame_number="5" location="+1+29" size="20×40" type="ming"/>
        <frame frame_number="6" location="+46+29" size="20×40" type="ming"/>
        <frame frame_number="7" location="+91+29" size="20×40" type="ming"/>
        <frame frame_number="1" location="+1+4" size="20×40" type="ming"/>
        <frame frame_number="1" location="+1+4" size="20×40" type="ming"/>
        <frame frame_number="1" location="+1+4" size="20×40" type="ming"/>
    <screen/>
    <screen>
        <! use for password input screen>
        <summary screen number = "2"/>
        <frame frame_number="1" location="+1+4" size="20×40" type="ming"/>
        <frame frame_number="2" location="+46+4" size="20×40" type="ming"/>
        <frame frame_number="3" location="+91+4" size="20×40" type="ming"/>
        <frame frame_number="4" location="+136+4" size="20×40" type="ming"/>
        <frame frame_number="5" location="+1+29" size="20×40" type="ming"/>
        <frame frame_number="6" location="+46+29" size="20×40" type="ming"/>
        <frame frame_number="7" location="+91+29" size="20×40" type="ming"/>
    <screen/>
</screen information>
```

<! use for initial screen>
    <summary page_number="1" use_screen_number="1"/>
    <frame frame_number="1" frame_key_code="none"display_characters="select user"/>
    <frame frame_number="2" frame_key_code="2" display_characters="user 1"/>
    <frame frame_number="3" frame_key_code="3" display_characters="user 2"/>
    <frame frame_number="4" frame_key_code="4" display_characters="user 3"/>
    <frame frame_number="5" frame_key_code="5" display_characters="user 4"/>
    <frame frame_number="6" frame_key_code="6" display_characters="user 5"/>
    <frame frame_number="7" frame_key_code="7" display_characters="user 6"/>
    <frame frame_number="8" frame_key_code="8" display_characters="previous page"/>
    <frame frame_number="9" frame_key_code="9" display_characters="next page"/>
    <frame frame_number="10" frame_key_code="10" display_characters="cancel"/>

<! use for password input screen>
    <summary page_number="2" use_screen_number="2"/>
    <frame frame_number="1" frame_key_code="none" display_characters
    ="enter password"/>
    <frame frame_number="2" frame_key_code="none" display_characters="user:"/>
    <frame frame_number="3" frame_key_code="none" display_characters
    ="subtractive number 1"/>
    <frame frame_number="4" frame_key_code="none" display_characters="password:"/>
    <frame frame_number="5" frame_key_code
    ="character_sequence" display_characters="*"/>
    <frame frame_number="6" frame_key_code="6" display_characters="ok"/>
    <frame frame_number="7" frame_key_code="7" display_characters="cancel"/>

<! use for user 1-1 screen>
    <summary page_number="3" use_screen_number="1"/>
    <frame frame_number="1" frame_key_code="none" display_characters
    ="select purpose of use"/>
    <frame frame_number="2" frame_key_code="2" display_characters="data"/>
    <frame frame_number="3" frame_key_code="3" display_characters="report"/>
    <frame frame_number="4" frame_key_code="4" display_characters="application"/>
    <frame frame_number="5" frame_key_code="5" display_characters="contract"/>
    <frame frame_number="6" frame_key_code="6" display_characters=" "/>
    <frame frame_number="7" frame_key_code="7" display_characters=" "/>
    <frame frame_number="8" frame_key_code="8" display_characters="previous page"/>
    <frame frame_number="9" frame_key_code="9" display_characters="next page"/>
    <frame frame_number="10" frame_key_code="10" display_characters="cancel"/>

```
‹user information›
    ‹user›
        ‹summary name="initial screen" use_page_number="1"/›
        ‹transition frame_key_code="2" action="to key code user"/›
        ‹transition frame_key_code="3" action="to key code user"/›
        ‹transition frame_key_code="4" action="to key code user"/›
        ‹transition frame_key_code="5" action="to key code user"/›
        ‹transition frame_key_code="6" action="to key code user"/›
        ‹transition frame_key_code="7" action="to key code user"/›
        ‹transition frame_key_code="8" action="none"/›
        ‹transition frame_key_code="9" action="none"/›
        ‹transition frame_key_code="10" action="to user initial screen"/›
        ‹log action="date/ key code user/ key monitoring"/›
    ‹/user›
    ‹user›
        ‹summary name="user 1" use_page_number="2"/›
        ‹transition frame_key_code="6" action="to user 1-1"/›
        ‹transition frame_key_code="7" action="to user initial screen"/›
    ‹/user›
    ‹user›
        ‹summary name="user 1-1" use_page_number= "3"/›
        ‹transition frame_key_code="2" action="to user 1-2"/›
        ‹transition frame_key_code="3" action="to user 1-2"/›
        ‹transition frame_key_code="4" action="to user 1-2"/›
        ‹transition frame_key_code="5" action="to user 1-2"/›
        ‹transition frame_key_code="6" action="none"/›
        ‹transition frame_key_code="7" action="none"/›
        ‹transition frame_key_code="8" action="none"/›
        ‹transition frame_key_code="9" action="none"/›
        ‹transition frame_key_code="10" action="to user initial screen"/›
    ‹/user›
‹/user information›
```

FIG.8

```
<log_information>
  <log_level>
  <log_level="1"/>
  <appln appln="1"/>
  <appln appln="copy"/>
  </log_level>
  <log_level>
  <log_level="2"/>
  <appln appln="copy, printer"/>
  <log_level>
       •
       •
       •
       •
       •
```

FIG.9

```
<log_information>
  <log_level>
  <log_level="1"/>
  <function copy="both-sides"/>
  <appln printer="enlargement/reduction"/>
  </log_level>
  <log_level>
  <log_level="2"/>
  <function copy="both-sides",sort/>
  <log_level>
       •
       •
       •
       •
```

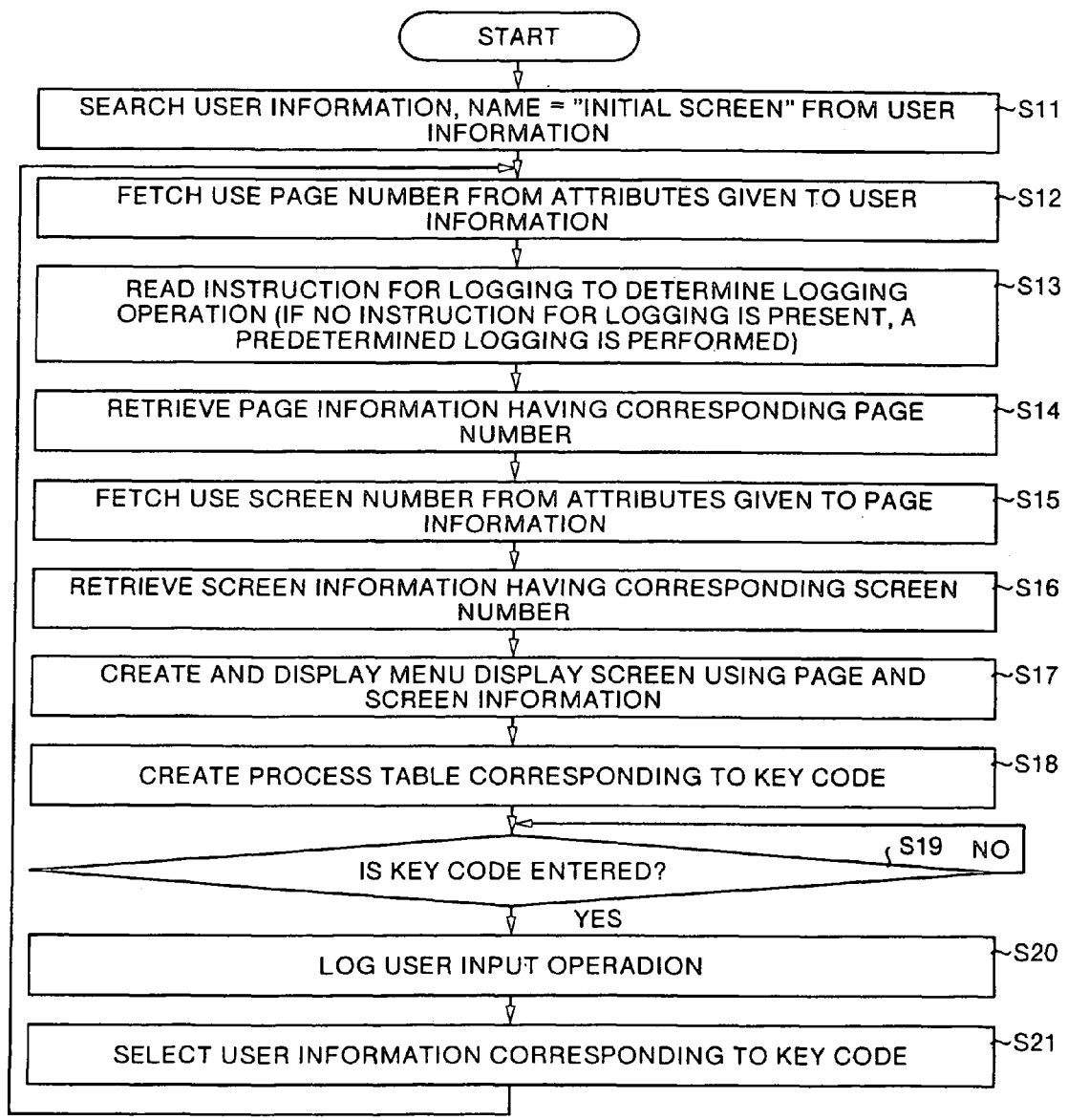

(12) United States Patent
US 8,576,438 B2

DIGITAL COMPUTER AND SYSTEM FOR RECORDING INFORMATION ON OPERATIONS

CROSS REFERENCE TO RELATED APPLICATIONS

This application is a divisional of U.S. application Ser. No. 10/195,390, filed Jul. 16, 2002, which is based upon and claims the benefit of priority under 35 U.S.C. §120, and under 35 U.S.C. §119 from Japanese Applications 2001-215929, filed Jul. 16, 2001 and 2002-201183, filed Jul. 10, 2002, the entire contents of each of which are incorporated herein by reference.

BACKGROUND OF THE INVENTION

1) Field of the Invention

The present invention relates to a computer ("digital computer") and a system for recording information on operations.

2) Description of the Related Art

Conventionally, a digital computer is often employed in complex machines that have multiple applications. The digital computer collects information on a log (log information) from the complex machine to manage users. Such digital computer is known to store the collected log information into a memory in the main part of the digital computer and, if required, reads it out.

A conventional image formation apparatus and method of controlling the same is disclosed in, for example, Japanese Patent Application Laid-Open No. 11-341212. What is disclosed is a technology that allows acceptance of multiple jobs. History of executed jobs is displayed and final historical information is read out upon reception of an enquiry through a network.

In the above-described technology, the collected log information is directly stored into a memory housed inside a main body of the devise. Therefore, if all operations performed by the user are logged together with the employed draft information, then the amount of required memory becomes massive and increases the total cost. If recording of log information is restricted uniformly to reduce the information to be stored, even the log information to be recorded may not be recorded.

SUMMARY OF THE INVENTION

It is an object of this invention to provide a digital computer and system for recording information on operations with which it is possible to efficiently log with reliable storing of required log information without influence on various operations, such as storing, imparted from an excessive massive amount of data.

The digital computer according to one aspect of the present invention comprises an operation execution unit which operates in accordance with instruction information for instructing operations, and a historical information recording unit which extracts operations to be recorded from operations executed by the operation execution unit on the basis of log levels stepwise indicative of contents in the operations executed by the operation execution unit and records historical information the extracted operations.

The system for recording information on operations according to another aspect of the present invention comprises a plurality of digital computers and at least one manager. The digital computer includes an operation execution unit which operates in accordance with instruction information for instructing operations, a log level storage unit which stores log levels of operations executed by the operation execution unit and log items corresponding to the log levels, and a historical information recording unit which extracts operations to be recorded from operations executed by the operation execution unit on the basis of the log items corresponding to the log levels among historical information on operations executed by the operation execution unit and records historical information on the extracted operations. The manager including a receiving unit which receives information transmitted from the multiple digital computers, and a recording unit which records the received information.

These and other objects, features and advantages of the present invention are specifically set forth in or will become apparent from the following detailed descriptions of the invention when read in conjunction with the accompanying drawings.

BRIEF DESCRIPTION OF THE DRAWINGS

FIG. 3 is a flowchart which shows brief operations in the arrangements shown in FIGS. 1 and 2, FIG. 4A through FIG. 4F show menu screens displayed on an operation touch panel shown in FIG. 1, FIG. 5 shows an example of descriptions in control information of the first embodiment, including an initial part by XML, an initial screen in screen information and a password entry screen, FIG. 6 shows a part of descriptions in control information of the first embodiment, including an initial screen in page information, a password entry screen and a user 1-1 screen, FIG. 7 shows a part of descriptions in control information of the first embodiment, including an initial screen in user information, a password entry screen and the user 1-1, FIG. 8 shows a part of descriptions in control information of the first embodiment for setting a key code of a frame for indicating an application and the corresponding action (log level) in combination, FIG. 9 shows a part of descriptions in control information of the first embodiment for setting a key code of a frame for indicating an operational mode in an operation screen on the complex machine and the corresponding action (log level) in combination, FIG. 10 is a flowchart which briefly shows procedures in a menu display process and logging.

DETAILED DESCRIPTIONS

The digital computer and system for recording information on operations according to the present invention will be described in detail below with reference to the accompanying drawings.

Figure 1A:
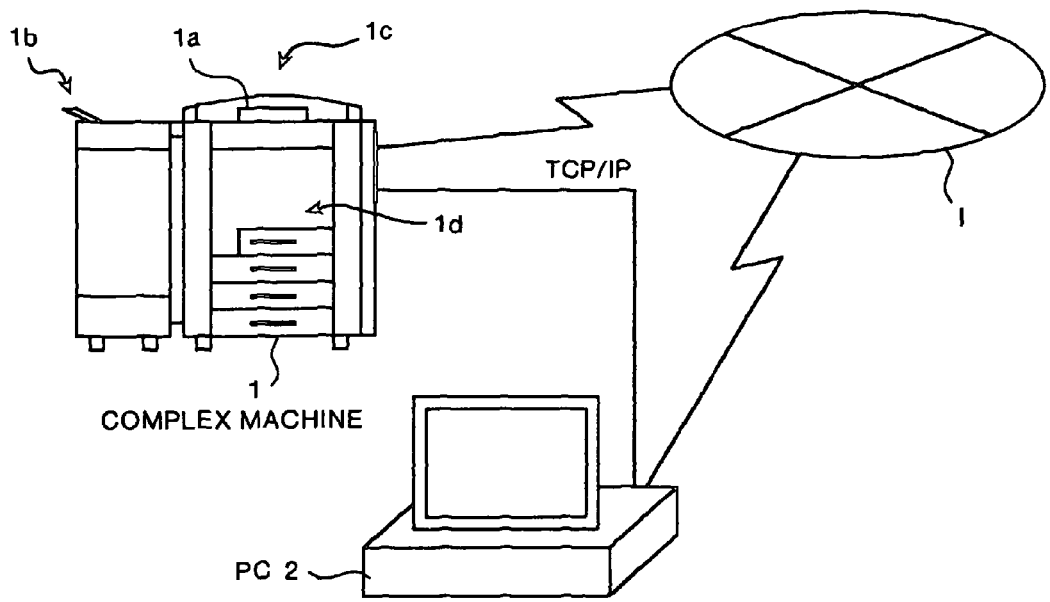
FIG. 1A shown a perspective view of an arrangement of a system using a complex machine that contains a digital computer according to a first embodiment of the present invention.

FIG. 1A shows a perspective view of the complex machine of a first embodiment. The complex machine system according to the present invention comprises a complex machine 1 and a personal computer (PC) 2, which are individually connected to the Internet I.

Each section shown in FIG. 1A will be described in detail below. The complex machine 1 is a digital complex machine that includes one or more of, a draft tray 1b for setting a draft thereon, a scanner 1c which scans the set draft to acquire image data, a communication section (shown in FIG. 2) which accepts image data from external devices, transmits the image data acquired at the scanner 1c and receives other image data, and a printer 1d which prints the image data. The complex machine 1 operates as a copier using the scanner 1c and the printer 1d in combination. It also operates as a printer using the communication section and the printer 1d in combination. It further operates as a facsimile using the printer 1d, the communication section, and the scanner 1c.

The complex machine 1 contains specific applications for realizing multiple functions such as copy, print, fax and scanner, respectively. The complex machine 1 includes a scanner engine 104 which drives a scanner and a plotter engine 105 which prints the image. The scanner engine 104 and plotter engine 105 have well-known configurations provided in common image formation apparatus and accordingly their further explanation will be omitted.

The complex machine 1 is equipped with an operation screen 1a for instructing an operation from the user to the complex machine 1. Executions of copying, printing and faxing can be instructed to the complex machine 1 via the operation screen 1a.

Figure 1B:
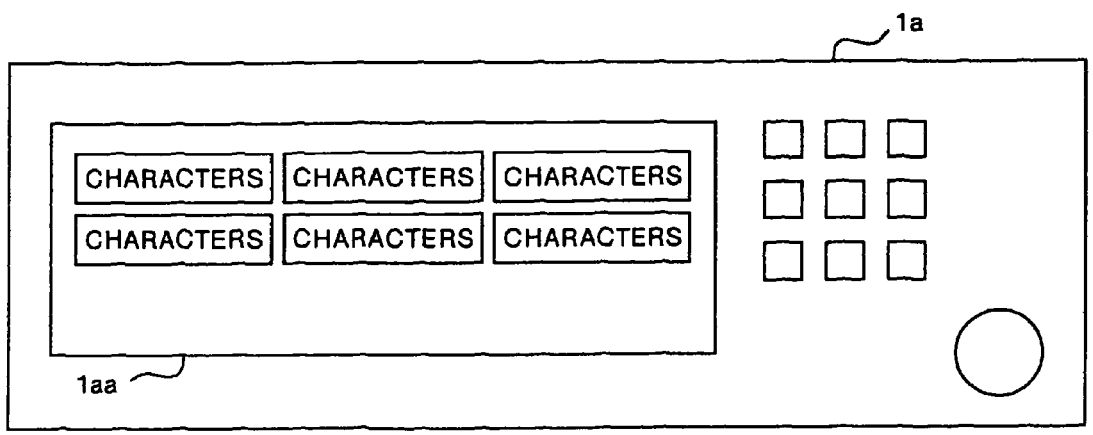
FIG. 1B shows a detail construction of an operation screen of the complex machine shown in FIG. 1A.

FIG. 1B shows an example of the operation screen 1a. As shown in FIG. 1B, the operation screen 1a has an operation touch panel 1aa and various operation buttons and dials. The operation touch panel 1aa displays an operation menu, which can be manipulated when the user touches the operation touch panel 1aa. Other operation buttons and dials than the operation touch panel 1aa in the operation screen 1a may be omitted depending on applications provided in the complex machine 1.

PC 2 is employed to create data (hereinafter referred to as "control information") per user required for menu display processing and logging. In the first embodiment, XML is employed in a format of the control information.

Figure 2:
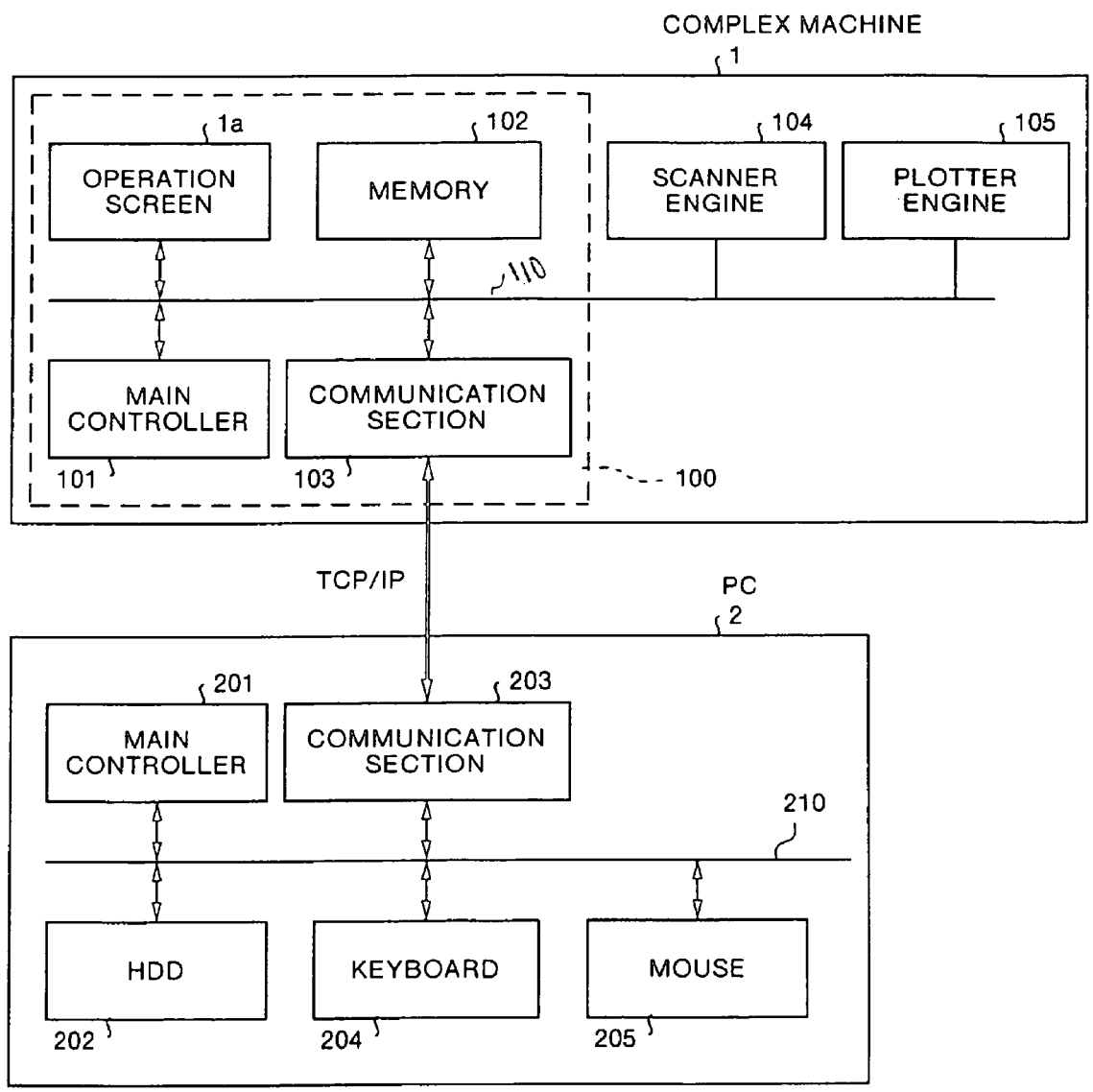
FIG. 2 is a block diagram which explains the digital computer of the first embodiment.

FIG. 2 is a block diagram which shows the major part of the complex machine 1 and PC 2 of the first embodiment. The complex machine 1 includes the operation screen 1a, a main controller 101, a memory 102 and a communication section 103. The operation screen 1a, main controller 101, the memory 102 and the communication section 103 are connected to an internal bus 110 to configure a digital computer 100 of the first embodiment.

In the above configuration, the main controller 101 serves as a correspondence storage unit which stores multiple levels and information to be stored corresponding to each level. The operation screen 1a serves as an input unit which enters level information indicating at least the level and operation information for instructing operations to be performed by the complex machine 1. The scanner 1c, the printer 1d, the scanner engine 104 and the plotter engine 105 serve as an operation execution unit which executes operations based on the operation information. The memory 102 servers as an operation recording unit which records only information on operations corresponding to the entered level information among the executed operations. As the level of the first embodiment is employed to determine the operation information to be recorded on the basis of the level information, hereinafter it is referred to as a log level. The operation information to be recorded corresponding to the log level is named as log information.

The main controller 101 includes a CPU and a ROM, not shown, and controls the whole operation of the complex machine 1. The main controller 101 operates on the basis of programs stored in a storage apparatus. It collects operation information (log information) on operations performed by the apparatus and records it in the memory 102.

The memory 102 includes a RAM (not shown) that is employed as a work area for the main controller 101 or to save (store) the recorded log information. This RAM is also employed to store an OS (operating system) required for operations of the complex machine 1 and control information created by the PC 2. The communication section 103 is connected to the Internet to communicate with the PC 2.

The PC 2 includes a main controller 201, a HDD 202, a communication section 203, a keyboard 204 and a mouse 205. Each of the above configurations is connected to an internal bus 210. The main controller 201 contains a CPU, not shown, which controls the whole operation of the PC 2. The HDD 202 is employed to store the OS required for operations of the PC 2 and log information transmitted by the complex machine 1.

The communication section 203 is connected to the Internet to communicate with the complex machine 1. The keyboard 204 and the mouse 205 serve as input units which enter instructions to PC 2 from the user.

The above-described digital computer 100 and PC 2 operate as shown in FIG. 3. PC 2 creates data (control information) per user required for menu display processing and logging (step S1). PC 2 downloads the created control information to the complex machine 1 (step S2). The control information is employed to create menu screens displayed on the operation touch panel 1aa of the operation screen 1a. A process for displaying a menu screen on the operation touch panel 1aa (menu display processing) is executed by using the control information when each user employs the complex machine 1 (step S3).

FIGS. 4A through 4F show menu screens displayed on the operation touch panel 1aa. FIG. 4A shows a screen for displaying multiple names of groups (departments) such as planning, engineering and sales, in which a user opens a tag of a group that includes the user among multiple groups. As shown in the figure, a tag of each group has keys that indicate names of persons belonging to the group, such as User A and User B. When a user touches the key indicating its own name, the main controller 101 switches the menu screen to another screen shown in FIG. 4B. The personal name is included in user information together with the later-described password.

FIG. 4B shows a screen for facilitating to enter a password. The main controller 101 determines whether the entered password is a correct password that matches with the user name and, if yes, switches the menu screen to another screen shown in FIG. 4C. The screen shown in FIG. 4C is employed for facilitating to select a purpose of the use of the complex machine 1. The purposes include Data, Report and Application. After selection of the purpose, the main controller 101 then switches the menu screen to another screen shown in FIG. 4D that displays types of documents to be created, such as Contract and Technical report.

After selection of the type of document in the screen shown in FIG. 4D, the main controller 101 displays contents selected in the screens shown in FIGS. 4A through 4D. In addition, it switches the menu screen to a screen (shown in FIG. 4E) for displaying functions of the complex machine 1 including copying and faxing. When a user confirms the content selected by the user itself from the displayed contents and selects a function to use, the menu screen is switched to an operation screen of each function (FIG. 4F).

When the user, the function of the complex machine 1 to be employed and the purpose to use the complex machine 1 are thus entered, the main controller 101 sets a log level of log information based on the entered information. That is, in the storage apparatus of the main controller 101, there are recorded passwords of multiple users, log levels of log information of the complex machine 1 set in multi-stages and corresponding relations between the passwords and the log levels. The log levels are set, for example, as follows.

Log Level 1
    Copier: Number of copies
    Printer: Number of prints
    Facsimile: Number of faxed pages, Destination, Date of transmission Log Level 2
    Copier: Number of copies, One-side/Both-sides, Enlargement/Reduction, Color/Monochrome
    Printer: Number of prints, Enlargement/Reduction, Color/Monochrome
    Facsimile: Number of faxed pages, Destination, Date of transmission, Amount of transmitted data Log Level 3
    Copier: Number of copies, One-side/Both-sides, Enlargement/Reduction, Color/Monochrome, Copied image (Compressed data)
    Printer: Number of prints, Enlargement/Reduction, Color/Monochrome, Printed image (Compressed data)
    Facsimile: Number of faxed pages, Destination, Date of transmission, Amount of transmitted data, Transmitted image (Compressed data)

The main controller 101 reads out the above log level corresponding to the user name and the password and sets it in the complex machine 1 to record log information on the complex machine 1 in accordance with the log level thus set. According to the above first embodiment, it is possible to alter the log level of log information per group that includes the user and to record the log information only required by each user or each group. Therefore, it is possible to eliminate the need for recording log information on a level not required by a user or a group and reliably ensure the required log information while suppressing the data amount of log information to be recorded.

FIGS. 5 through 7 show control data for use in display of the menu screens shown in FIGS. 4A through 4F.

The control information shown in FIGS. 5 through 7 has a data format that employs XML. The XML is described below.

XML (extensible Mark-up Language) is a language to impart a structure to a document and does not depend on a specific application. Through the use of the characteristic that a structure can be imparted, it is possible to describe a structure of data processed in programs. Therefore, the control information in this example utilizes XML in the data format.

An XML document comprises an XML declaration, a document type declaration and an XML instance. The XML declaration is a part beginning from "xml" and designating a version and a graphic character code. The document type declaration is not required to describe data and the XML instance is employed to describe the contents of the data.

The XML instance includes elements such as a start tag, contents, an ending tag and blank elements. It is required to employ the start tag to markup the start of an arbitrary XML element that is not a blank element. It is required to employ the ending tag to markup the ending of an element that begins from the start tag. The following additional information may be imparted on elements depending on attributes.

<element name attribute name 1="Attribute value 1"attribute name 2="Attribute value 2">

One that can explicitly indicate a document element that has no lower element or no content is called a space element tag.

<element name (attribute designation)/>

For example, the following two expressions have the same effect.

<image file="fig1. jpg"/>

<image file="fig1. jpg"/></image>

An example of descriptions in control information shown in FIGS. 5 through 7 will be described next. The control information contains screen information, page information and user information and is configured in the form of a link of descriptions in the above information.

FIG. 5 shows descriptions in the control information, including an initial part by XML, an initial screen in the display screen information and a password entry screen. The screen information shown in FIG. 5 describes information on basic layouts in the screens displayed on the operation touch panel 1*aa*. The basic layouts are each summarized by the screen number. The user information designates the page number of a screen to be displayed next. The page information designates the screen number corresponding to the screen having the above page number. The main controller 101 reads a part of the screen information corresponding to the designated screen number.

FIG. 6 shows a part of descriptions in the control information, including an initial screen in the page information, a password entry screen and a first screen displayed to the user 1. The page information shown in FIG. 6 describes information on each screen to be displayed. It includes key codes of frames, characters displayed in the frame, screen numbers indicating basic layouts to be employed. The information in the screen to be displayed next, corresponding to the user information, is read out by the main controller 101 from a part of the page information at the corresponding page number.

FIG. 7 shows a part of descriptions in combination of frame key codes and the corresponding actions as the user information, including an initial screen, a password entry screen and a first screen displayed to the user 1. Transition of screens can be controlled by the user information. Each user information additionally includes items to be recorded per user and page information.

In other words, the user information includes a combination of actions for a page number used in each display screen (a designated number of page information to be used) and a frame key code in each display screen, and an item per user to be recorded as log information at each display screen. When the user touches the frame in the screen displayed on the operation touch panel 1*aa*, the frame key code and action are read out and, in accordance with the information read out, the next operation is determined.

As described above, the first embodiment describes an example, in which the log level is set based on the user information (password). The present invention is not limited in such the first embodiment, however. Rather, the log level may be set in accordance with the application or the engine in the complex machine 1 other than the user information.

The log item at the log level in accordance with the application may be set, for example, as follows.

Copy
- Log level 1: Number of copies
- Log level 2: Number of copies, Enlargement/Reduction, Color/Monochrome
- Log level 3: Number of copies, Enlargement/Reduction, Color/Monochrome, Copied image Printer
- Log level 1: Number of prints
- Log level 2: Number of prints, Enlargement/Reduction, Color/Monochrome
- Log level 3: Number of prints, Enlargement/Reduction, Color/Monochrome, Printed image Facsimile
- Log level 1: Number of faxed pages, Destination, Date of transmission
- Log level 2: Number of faxed pages, Destination, Date of transmission, Amount of transmitted data
- Log level 3: Number of faxed pages, Destination, Date of transmission, Amount of transmitted data, Transmitted image Otherwise, the log level (log item) may be automatically set according to the selection of the application as shown below.

Copy->log level 3
Print->log level 2
Facsimile->log level 1

FIG. 8 shows a part of descriptions for setting a key code of a frame indicating an application and the corresponding action (log level) in combination.

The log item at the log level in accordance with the engine may be set, for example, as follows.

Scanner Engine
- Log level 1: Number of scans
- Log level 2: Number of scans, Scanning speed
- Log level 3: Number of scans, Scanning speed, Read image Plotter Engine
- Log level 1: Number of output pages
- Log level 2: Number of output pages, Time for output
- Log level 3: Number of output pages, Time for output, Color of used toner Otherwise, the log level (log item) may be automatically set according to the selection of the engine as shown below.

Scanner engine->log level 3
Plotter engine->log level 2

The log levels of the present invention may be set in accordance with operation modes (also noted as functions such as enlargement/reduction) of applications. The log levels may also be set in accordance with a combination of the above-described user information and applications. FIG. 9 shows a part of descriptions for setting a key code of a frame indicating an operational mode in an operation screen on the complex machine 1 and an action (log level) corresponding to the key code in combination. When the above FIGS. 5 through 8, FIGS. 5 through 7 and 9 are sequentially linked, the control information can be formed. The control information described above is created in PC 2, then downloaded in the complex machine 1 with ftp and the like via the Internet, and stored in the memory 102.

The basic procedures in the menu display processing and information recording (logging) performed in the complex machine 1 will be described next with reference to the flow-chart shown in FIG. 10.

The main controller 101 retrieves the user information from the user information in the control information for the name="Initial screen" (step S11). Then, from the description obtained by the retrieval at step S11, the main controller 101 reads the use page number (step S12). In addition, from the description obtained by the retrieval at step S11, the main controller 101 reads the instruction for logging and determine the information read out as the content of log information to be collected (collection level) (step S13). If no instruction for logging is present, a predetermined logging is performed.

The main controller 101 retrieves the description of the page number read out at step S12 out of the page information in the control information (step S14). It reads the use screen number out of the description of the page number obtained from the retrieval at step S14 (step S15). The main controller 101 retrieves the description of the use screen number read out at step S15 out of the screen information in the control information (step S16).

The main controller 101 creates a menu display screen from the corresponding descriptions in the page information and screen information obtained from the retrievals at step S14 and step S16 to display it on the operation touch panel 1*aa* (step S17). When the user enters (touches) the frame in the operation touch panel 1*aa*, the corresponding key code is read out from the user information. In this case, the main controller 101 creates a process table, which contains information on which programs (programs previously stored in the complex machine) to perform and of which of processes by the entered key code (step S18).

The main controller 101 determines whether the user has employed the operation touch panel 1*aa* to enter the key code (step S19). If the user has not employed the operation touch panel 1*aa* to enter the key code (step S19: NO), a standby mode works to wait for an entry. If the user has entered (step S19: YES), it logs the entry operation performed by the user (step S20). It selects the action corresponding to the entered frame key code from the user information (step S21) and returns to step S12 for repeating the same processes based on the selected action (user information).

Figure 11:
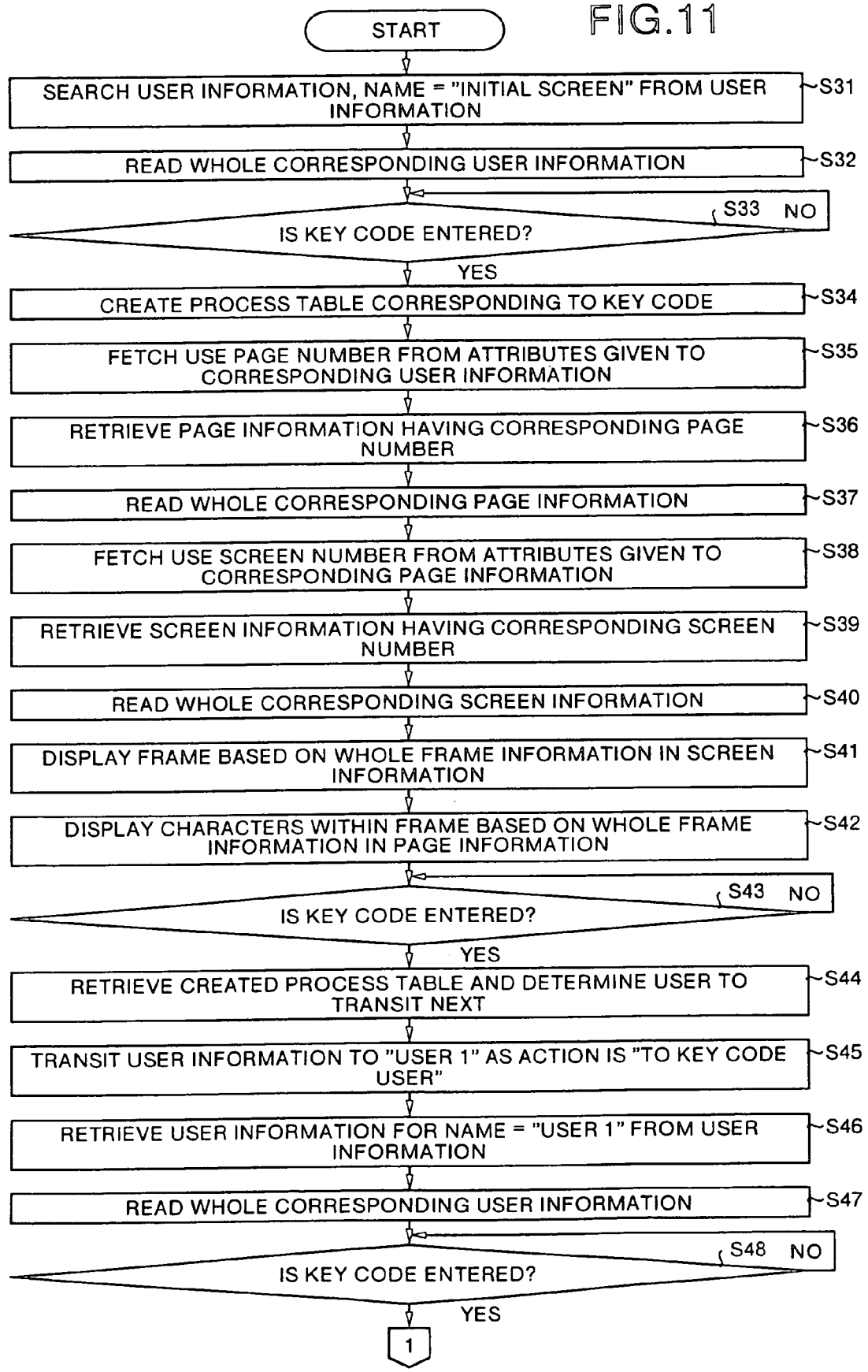
FIG. 11 is a flowchart which shows operations in a menu display process and logging process (a first third part)
Figure 12:
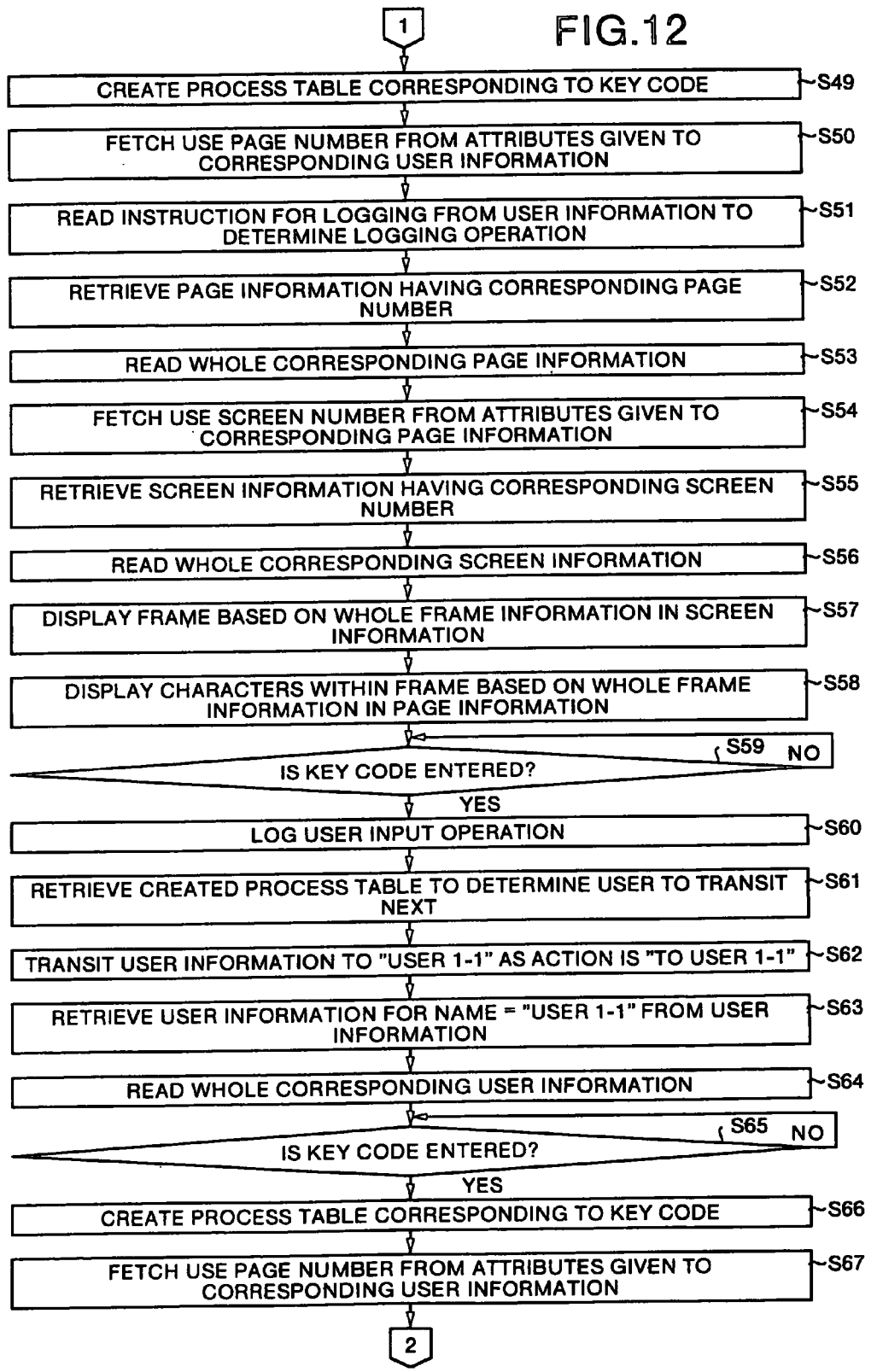
FIG. 12 is a flowchart which shows operations in a menu display process and logging process (the middle third part)
Figure 13:
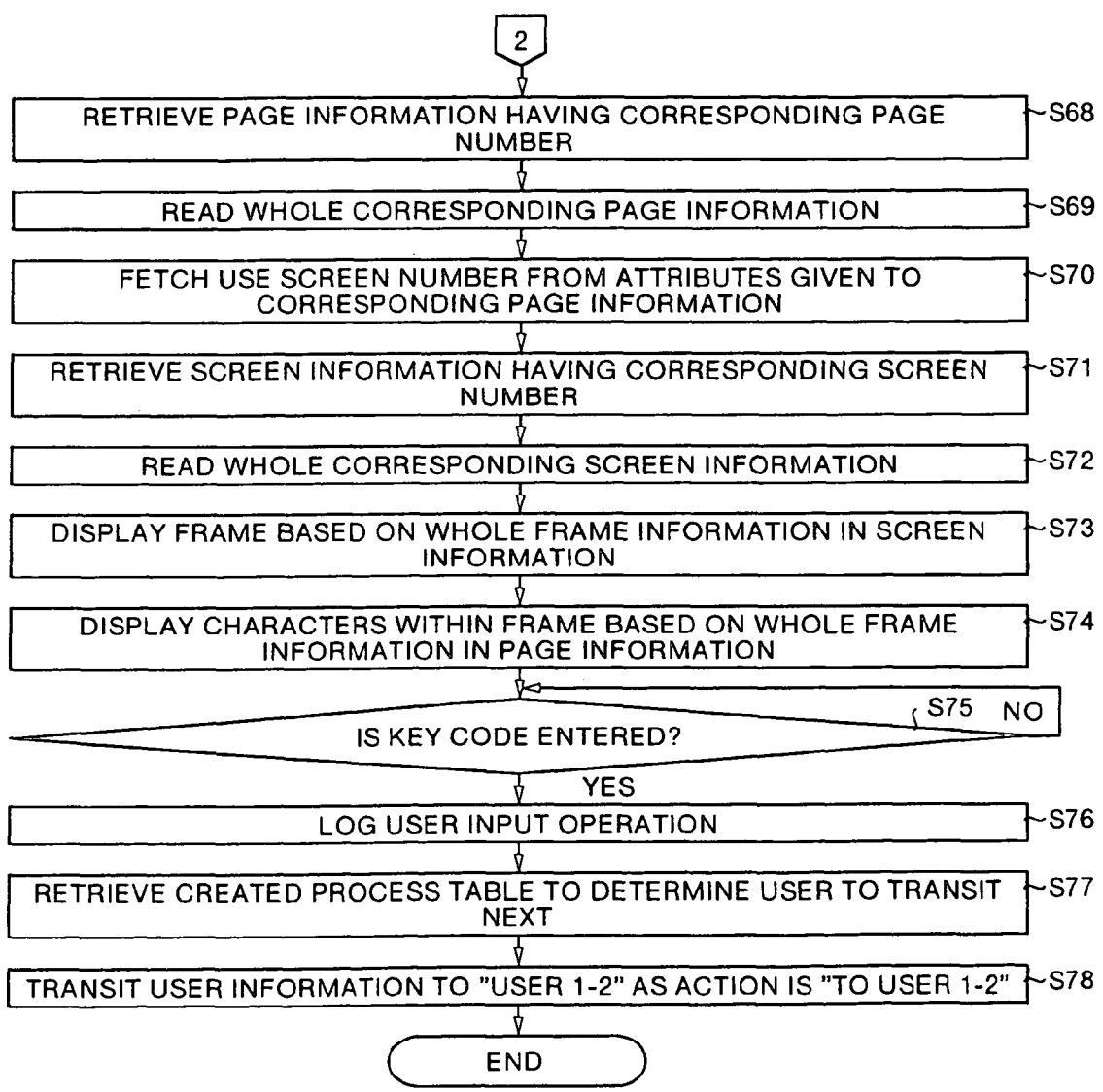
FIG. 13 is a flowchart which shows operations in a menu display process and logging process (the last third part)

Operations of the menu display and logging process to be executed in the complex machine 1 will be described with reference to FIGS. 11 through 13. FIGS. 11 through 13 are flowcharts which show operations in the menu display process and logging process and exemplify an operation when the user 1 employs the complex machine 1 for the purpose of creating Data. The control information is assumed to include the contents shown in FIG. 5, FIG. 6 and FIG. 7. The operations of the menu display process and logging process have bases to repeat the above-described basic procedures shown in FIG. 10 per display screen. Therefore, operation steps or operation contents common with the above-described basic procedures shown in FIG. 10 are omitted to describe in detail.

The main controller 101 reads the control information stored in the memory 102. Then, it retrieves user information for the name="Initial screen" from plural user information (step S31) and reads the whole corresponding user information (step S32). The main controller 101 determines whether or not the key code is entered (step S33). If the key code is not entered (step S33: No), it waits for an entry. If the key code is entered (step S33: Yes), it creates a process table corresponding to the entered key code (step S34).

The main controller 101 fetches the use page number from the attributes given to the corresponding user information (step S35). It retrieves the page information having the corresponding page number (step S36) and reads the whole corresponding page information (step S37). The main controller 101 fetches the use screen number from the attributes given to the corresponding page information (step S38). Then, it retrieves the screen information having the corresponding screen number (step S39), reads the whole corresponding screen information (step S40) and displays a frame based on the whole frame information in the screen information (step S41). It further displays characters within the frame based on the whole frame information in the page information (step S42). Through the above processes, the initial screen is displayed on the operation touch panel 1*aa*. After the display of the initial screen, the main controller 101 proceeds to a standby mode to wait for another entry from the user (step S43).

When the user enters in the frame of "User 1", a key code="2" corresponding to "User 1" is returned. Therefore, the main controller 101 retrieves the process table created at step S34 and determines the user to transit next (step S44). In this case, as the action is "To key code user", the user information transits to "User 1" (step S45). It retrieves the user information for the name="User 1" from the user information (step S46) and reads the whole corresponding user information (step S47). A standby mode works to wait for a key code entry (step S48). If the key code is entered, it creates a process table corresponding to the entered key code (step S49).

The main controller 101 fetches the use page number from the attributes given to the corresponding user information (step S50). Then, it reads an instruction for logging from the attributes given to the corresponding user information to determine an operation of logging. If no instruction for logging is present, a predetermined logging is performed (step S51). Next, the main controller 101 retrieves the page information having the corresponding page number (step S52) and reads the whole corresponding page information (step S53). Then, it fetches the use screen number from the attributes given to the corresponding page information (step S54), retrieves the screen information having the corresponding screen number (step S55), and reads the whole corresponding screen information (step S56). It further displays a frame based on the whole frame information in the screen information (step S57). The main controller 101 displays characters within the frame based on the whole frame information in the page information (step S58). Through the above processes, the password entry screen is displayed The main controller 101 proceeds to a standby mode to wait for an entry from the user (step S59). If the user enters a password and touches on a frame of "OK", the main controller 101 logs the input operation from the user (entered content) (step S60). When a key code="6" corresponding to "OK" is returned, it retrieves the process table created at step S49 to determine the user to transit next (step S61). Referencing to the user information, as the action is "To user 1-1", the user information to be read transits to "User 1-1" (step S62).

The main controller 101 retrieves the user information for the name="User 1-1" from the user information (step S63). It reads the whole corresponding user information (step S64), and proceeds to a standby mode to wait for a key code entry (step S65) If the key code is entered, it creates a process table corresponding to the entered key code (step S66).

The main controller 101 then fetches the use page number from the attributes given to the corresponding user information (step S67) and retrieves the page information having the corresponding page number (step S68) Further, it reads the whole corresponding page information (step S69). Then, it fetches the use screen number from the attributes given to the corresponding page information (step S70). The main controller 101 retrieves the screen information having the corresponding screen number (step S71). It then reads the whole corresponding screen information (step S72) and displays a frame based on the whole frame information in the screen information (step S73). It further displays characters within the frame based on the whole frame information in the page information (step S74). Through the above processes, the use selection screen is displayed.

The main controller 101 proceeds to a standby mode to wait for an entry from the user (step S75). If the user touches on the part of "Data", it logs the input operation from the user (step S76). When a key code="2" corresponding to "Data" is returned, therefore, it retrieves the process table created to determine the user to transit next (step S77). Here, referencing to the user information, as the action is "To user 1-2", the user information to be read transits to "User 1-2" (step S78).

The present invention is not limited in the above-described case of acquiring the user information through the operation screen 1*a*. Alternatively, it may be applied to acquiring the user information from PC 2 or any other PCs over the network through the communication section 103 or communication unit which connect the complex machine 1 to external information devices.

When the user information is entered from a PC, the main controller 101 in the digital computer 100 converts a signal generated from the keys of the keyboard or mouse of the PC into a key code to execute the same process as is noted in FIGS. 10 through 13. It converts the signal entered from the PC, which converted signal is employed to identify the user information. A menu screen is created in accordance with the attribute of the user information and transmitted to the PC via a network. The transmitted menu screen is displayed on the display screen in the PC and employed by the user to select the use, document and application along the menu screen.

The information selected by the user is transmitted to the digital computer 100, which records log information on the complex machine 1, instructed by the user, at a log level in accordance with the user information.

Figure 14:
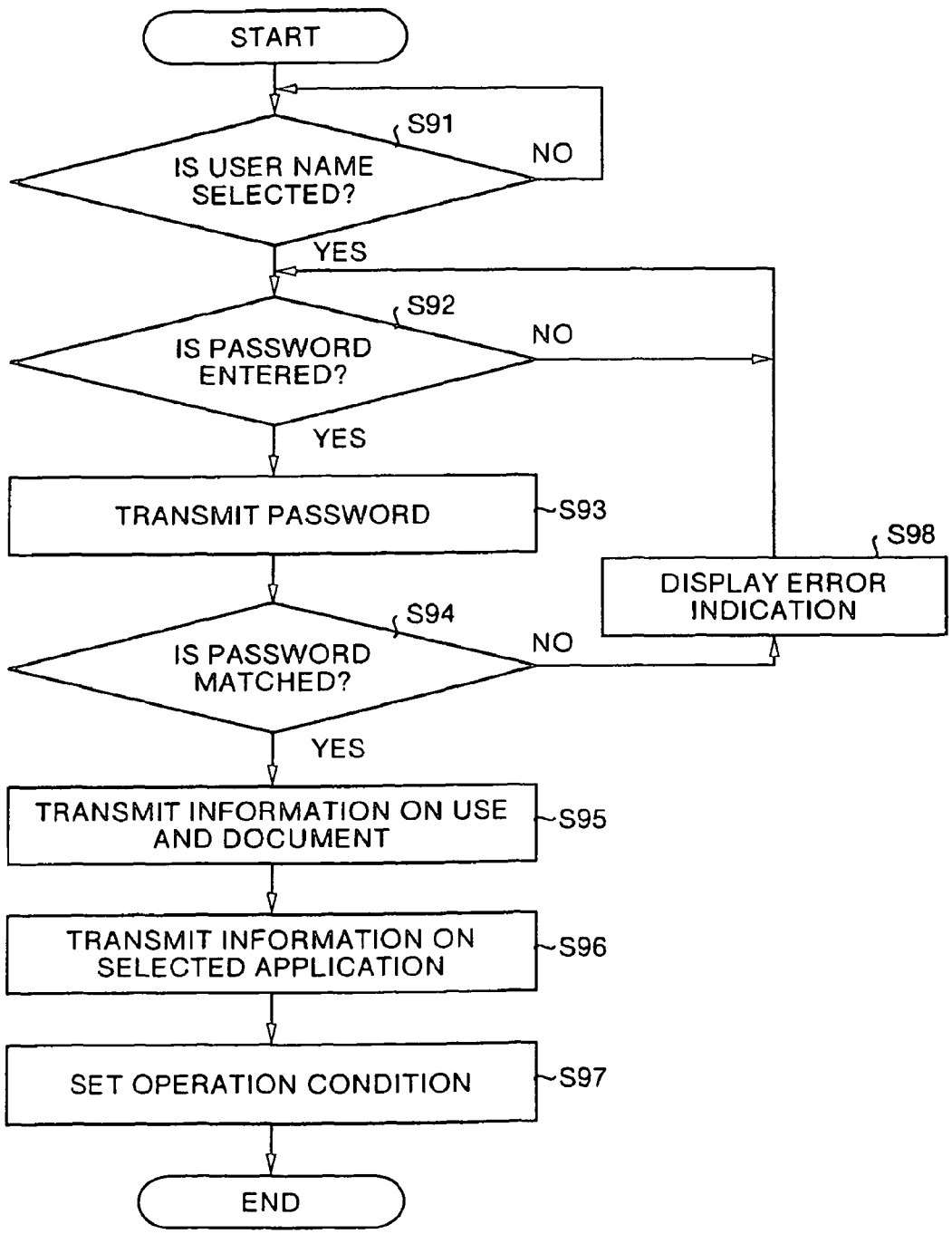
FIG. 14 is a flowchart which explains the process performed by PC when the digital computer of the first embodiment acquires user information from the PC over a network.

A process executed in the PC for entering the user information will be described next. FIG. 14 is a flowchart which explains the process performed by an arbitrary PC when the digital computer 100 acquires the user information from the PC over a network.

To manipulate the complex machine 1 from the PC, the user selects the group that contains the user itself from the menu screen displayed on the display screen, and subsequently selects the name of the user itself from the tag, using the mouse or keyboard. The PC determines whether the name of the user is selected (step S91) and, if the name of the user is not selected (step S91: No), waits for its selection.

If the name of the user is selected (step S91: Yes), the PC then determines whether the password is entered by the user (step S92). If the password is entered (step S92: Yes), it transmits the entered password to the digital computer 100 (step S93). Based on the response from the digital computer 100, it determines whether the transmitted password is coincident with the name of the group or user selected by the user (step S94). As a result of the determination, if the password is not coincident (step S94: No), it displays an error indication on the display screen to show a mismatch of the password (step S1).

To the contrary, if the password is coincident (step S94: Yes), it receives information for creating a menu screen from the digital computer 100 to display the menu screen on the display screen. The user enters the use of the complex machine 1 and the type of document to be created in the menu screen. The PC transmits the entered information on the use and document to the digital computer 100 (step S95). Similarly, it transmits information on the application selected by the user (step S96).

After completion of the above processes, the digital computer 100 sends information for creating an operation screen for the selected application. This information is employed to display the operation screen for the application on the display screen in the PC. The PC sends the operational condition for the complex machine 1 designated through the operation screen by the user to the digital computer 100 to set the operational condition in the complex machine 1 (step S97).

As described above, even when the PC sends the user information to the digital computer 100 via the network to set the log level, the digital computer 100 sets a log level in accordance with the user information and records log information at the set log level.

As described in the first embodiment, the present invention is not limited in the case of setting the log level in accordance with the user information, application and engine. For example, without entering the user information such as the password, the user may enter the level to be stored in the main controller 101 and select the level using the operation screen 1a.

The user information is not limited in the password. Any other information may also be employed so long as it can specify the user or the group that contains the user, such as an employee number and an ID code.

A second embodiment of the present invention will be described next. The second embodiment is a system for recording information on operations. There is provided the digital computer of the first embodiment equipped with the unit which transmits the log information to the outside, and a manager which manages multiple image formation apparatus connected over a network. The manager includes a receiving unit which receives the transmitted log information via the network.

Figure 15:
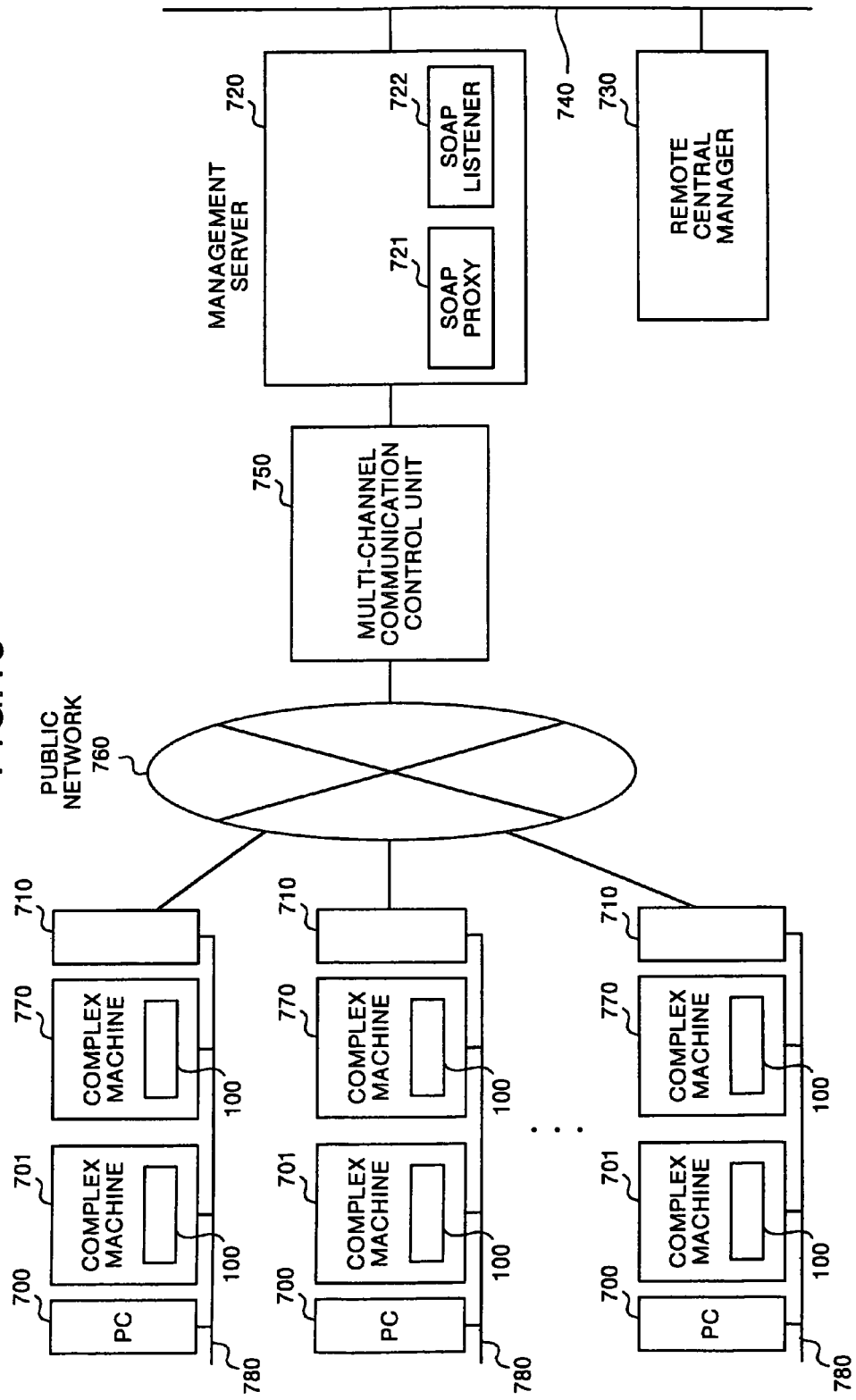
FIG. 15 shows a system for recording information on operations according to a second embodiment of the present invention.

FIG. 15 is a block diagram which shows a network arrangement in the system for recording information on operations according to the second embodiment. As shown in FIG. 15, the system for recording information on operations according to the second embodiment comprises a management server 720 and plural sets of complex machines 701 and 770, which are connected via a public network 760. The complex machines 701 and 770 have different assignments of IP addresses or URIs.

The management server 720 is connected to a remote central manager 730 via a network such as the Ethernet 740. In the second embodiment, either of the management server 720 and the remote central manager 730 serves as a manager. The complex machines 701 and 770 have the same arrangement as that of the complex machine 1 of the first embodiment. In addition, each of the complex machines 701 and 770 includes the digital computer 100 of the first embodiment mounted thereon. The digital computer 100 is employed to transmit and receive the log information between the managers via the network. In the second embodiment, the log information is transmitted and received on the basis of SOAP (Simple Object Access Protocol).

The complex machine 701 comprises a SOAP listener 212 and a SOAP proxy 211 in a NCS 128. The SOAP listener 212 is employed to receive a SOAP request message for requesting a processed result from a PC 700, the other complex machine 770 and the management server 720, analyze the contents and transmit a process request to a CCS 129. The SOAP proxy 211 is employed to create a SOAP response message including the processed result data from an authentication/availability-restricted state file 221, an account file 223 and a log file 224 and return it to the destination that sent the SOAP request message. Such the complex machine 701 also has a function as a SOAP server.

As described above, the second embodiment is configured to create, transmit and receive the log information based on SOAP. Therefore, it is possible to transmit and receive information on processed results based on the standard specification among a large number of indefinite complex machines, PCs and management servers over the network. Accordingly, the information on the processed result created by a single complex machine 1 can be easily utilized at any locations over the network for desired uses.

A multi-channel communication control unit 750, connected to the management server 720, is connected to the public network 760 and, via communication controllers 710 and connected to plural sets of the complex machines 701 and 770. The complex machines 701 and 770 are connected to the PC 700 that serves as a printer client via a network such as the Ethernet® 780. This PC 700 is also equipped with a SOAP listener and a SOAP proxy (both not shown) to realize data interchange on SOAP.

The communication controllers 710 are connected to facsimile devices and general telephones at clients. When the facsimile devices and general telephones are not employed (lines are idling), they can communicate data (off-talk communication type) between the multi-channel communication control unit 750 and the communication controllers 710 via the public network 760.

The management server 720, employed to configure the manager of the present invention, collects processed result data from the multiple complex machines 701 and 770 as SOAP response messages and sends them to the remote central manager 730 via a LAN 208. It is connected to the public network 760 via a multi-channel communication control unit (CCU) 209. The management server 720 has the same arrangement as that of a general computer such as a workstation. It is equipped with a SOAP proxy 721 and a SOAP listener 722 to realize data interchange on SOAP as shown in FIG. 7.

The SOAP proxy 721 is employed to create a SOAP request message for requesting a processed result and transmit it to the complex machine 701. The SOAP listener 722 on the other hand is employed to receive a SOAP response message containing the processed result data from the complex machine 701, analyze the content and transmit it to the remote central manager 730.

The remote central manager 730 is employed to receive the result data, processed at the multiple complex machines 701 and collected by the management server 720, via the Ethernet® 740 to integrally manage them.

Figure 16:
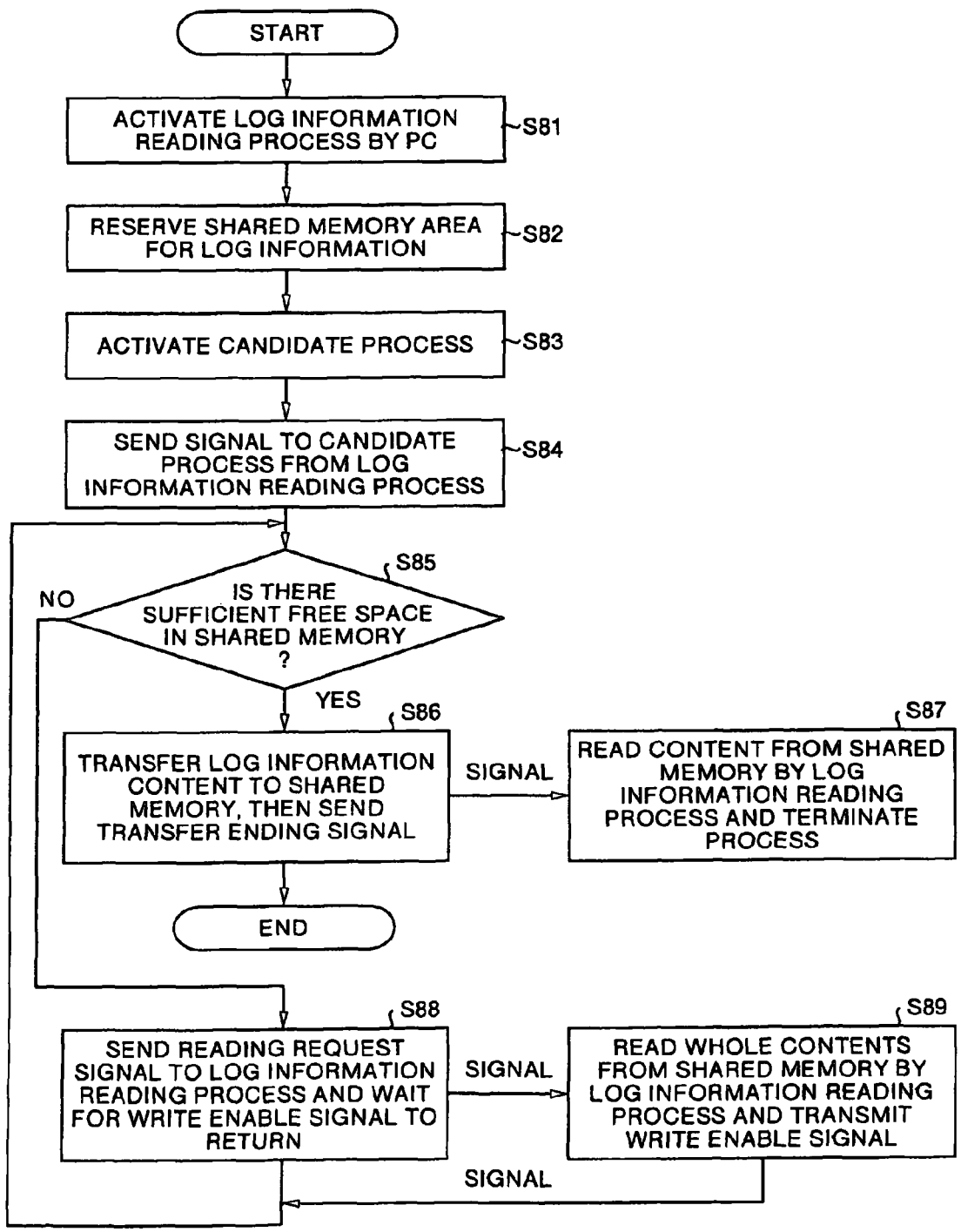
FIG. 16 is a flowchart which shows a sequence of processes in the system for recording information on operations according to the second embodiment.

The processes executed in the above-described system for recording information on operations will be described with reference to a flowchart shown in FIG. 16. In this system for recording information on operations, a PC on the system is employed to initially activate a log information reading process (step S81). After activation, the log information reading process reserves an area on a shared memory (step S82).

When a candidate process is activated (step S83), the log information reading process generates a software interrupt to the candidate process and sends a signal to the candidate process from the log information reading process (step S84). A log information writing process in the software-interrupted candidate process writes the log information in the shared memory.

The area of the shared memory is limited. Therefore, after the whole area is completely employed, it is required to return to the start point of the area for further writing.

At the time when the candidate process transfers the log information to the shared memory, it checks if a free space is remained in the shared memory by an amount sufficient to transfer the information (step S85). If the space is present, the candidate process transfers the log information and sends a transfer ending signal to the log information reading process (step S86). When the log information reading process receives a reading request signal or a transfer ending signal from the log information writing process in the candidate process, it reads communication contents (log information) from the shared memory (step S87), and transfers the read-out communication contents to the PC via the network.

When the candidate process checks if a free space is remained in the shared memory by an amount sufficient to transfer the log information and finds that the free space is not sufficient, it sends a reading request signal to the log information reading process (step S88). Then, the candidate process interrupts the transfer process until it receives from the log information reading process a write enable signal indicating that the shared memory is completely empty.

On receipt of the reading request signal from the log information transfer process (the candidate process), the log information reading process promptly reads out the whole content stored in the shared memory and transfers it to the PC via the network. After completion of the transfer, it sends a write enable signal to the candidate process (step S89).

The complex machines and PCs, though they are connected via the Internet as described in the second embodiment, may be connected via other networks or wired/wireless lines so long as they are communicatively connected.

The control information of the present invention may be created when the user enters XML language into a PC using the keyboard or mouse of the PC. Software for creating control information may be prepared separately. This software operates to automatically create the XML control information when the user enters the minimum designated items from the PC.

In the first and second embodiments of the present invention, the control information is described to have a format that employs XML but it is not limited to this and other formats maybe employed so long as the complex machine can read their languages.

The complex machines of the first and second embodiments may contain a CD-ROM drive to provide a function for rewriting operation programs. If the function for rewriting operation programs is provided, the operations of the first and second embodiments can be executed simply with programs. The complex machine may include a HDD as the memory. If the complex machine includes the HDD, it is desired that the HDD in the PC has a larger storage capacity than the HDD in the complex machine. This is effective to prevent the HDD in the PC from lacking in the remaining storage capacity for the log information sent from the complex machine.

The above-described embodiments are preferred embodiments of the present invention and may be varied within the scope of the present invention.

As obvious from the forgoing explanations, according to one aspect of the invention, there are extracted operations to be recorded from operations executed by the operation execution unit on the basis of log levels stepwise indicative of contents in the operations and recorded the historical information on the extracted operations. Therefore, it is possible to efficiently log with reliable storing of required information without influence on various operations, such as storing, imparted from an excessive massive amount of data.

According to another aspect of the invention, information on operations may be transmitted to the manager. Therefore it is possible to efficiently log with reliable storing of required information without influence of various operations, such storing, imparted from an excessive massive amount of data.

The present document incorporates by reference the entire contents of Japanese priority documents, 2001-215929 filed in Japan on Jul. 16, 2001 and 2002-201183 filed in Japan on Jul. 10, 2002.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A digital computer included in a digital complex machine comprising a scanner and a printer, the digital computer comprising:
    a processor including:
    an operation executing unit which operates in accordance with instruction information for instruction operations;
    a controller serving as a correspondence storage unit to store recording levels of log information, which indicate contents of operation executed by the operation execution unit in multiple levels including three or more and where each said level is determined based on a combination of a parameter and an item to be recorded, by extracting and determining the log information to be recorded and information corresponding to each of the recording levels, the log information being information on performance executed by a plurality of applications which are capable of handling image data,
    wherein the controller reads out the recording levels corresponding to user name, password, application or engine in the digital complex machine and to set the recording levels in the digital complex machine to record log information on the digital complex machine in accordance with the recording levels thus set;
    an input unit that enters one of the recording levels and the log information for instructing operations to be performed by the complex machine, the recording levels being set in accordance with each of the plurality of applications;
    a log information storage unit that is included in the controller and that stores the log information corresponding to one of the recording levels entered,
    wherein the log information storage unit alters the recording levels of log information per group that includes a user and records the log information only required by each user or each group, and eliminates the log information on a level not required by the user or the group and ensures required log information while suppressing data amount of log information to be recorded;
    a network communication unit that communicates with an external device connected to the complex machine over a network;
    a receiving unit that receives data written in eXtensible Markup Language, as a transmission request of the log information stored in the log information storage unit from the external device, through the network communication unit based on SOAP; and
    a transmitting unit that generates data describing a result of the transmission request in the eXtensible Markup Language corresponding to the recording level, and transmits the data generated to the external device based on the SOAP.

2. The digital computer according to claim 1, wherein the transmitting unit generates data including information on certification and restriction of use or information on charging, and transmits the data generated to the external device based on the SOAP.

3. The digital computer according to claim 1, wherein the receiving unit is a SOAP listener and the transmitting unit is a SOAP proxy.

4. The digital computer according to claim 1, wherein the recording level can be set according to contents of performance of an application.

5. The digital computer according to claim 1, wherein the recording level can be set according to selection of an application.

6. The digital computer according to claim 1, wherein the recording level can be set according to a mode of performance of an application.

7. The digital computer according to claim 1, further comprising a recording level setting unit to set the recording level.

8. An external device to communicate to a digital computer included in a digital complex machine comprising a scanner and a printer, the external device comprising:
  a first processor including:
  a network communication unit that communicates with the digital computer connected to the external device over a network, wherein the digital computer includes:
  a second processor including:
    an operation executing unit which operates in accordance with instruction information for instruction operations;
    a controller serving as a correspondence storage unit to store recording levels of log information, which indicate contents of operation executed by the operation execution unit in multiple levels including three or more and where each said level is determined based on a combination of a parameter and an item to be recorded, by extracting and determining the log information to be recorded and information corresponding to each of the recording levels, the log information being information on performance executed by a plurality of applications which are capable of handling image data,
    wherein the controller reads out the recording levels corresponding to user name, password, application or engine in the digital complex machine and to set the recording levels in the digital complex machine to record log information on the digital complex machine in accordance with the recording levels thus set;
    an input unit that enters one of the recording levels and the log information for instructing operations to be performed by the complex machine, the recording levels being set in accordance with each of the plurality of applications; and
    a log information storage unit that is included in the controller and that stores the log information corresponding to one of the recording levels entered,
    wherein the log information storage unit alters the recording levels of log information per group that includes a user and records the log information only required by each user or each group, and eliminates the log information on a level not required by the user or the group and ensures required log information while suppressing data amount of log information to be recorded; and
  a server including:
    a transmitting unit that generates data in the eXtensible Markup Language corresponding to the recording level, and transmits the data generated to the digital computer based on SOAP; and
    a receiving unit that receives data written in eXtensible Markup Language, as a result of a transmission request from the digital computer, based on the SOAP.

9. The external device according to claim 8, wherein the receiving unit is a SOAP listener and the transmitting unit is a SOAP proxy.

10. The digital computer according to claim 1, wherein the log information includes at least one of a number of copies, a number of prints, a number of pages faxed, a destination of the faxed pages, a date of transmission of the faxed pages, an amount of data transmitted, and compressed image data.

11. The digital computer according to claim 1, wherein the recording levels include a first level of log information having first parameters of the information on performance executed by a first set of the plurality of applications, a second level of log information having second parameters of the information on performance executed by a second set of the plurality of applications, and a third level of log information having third parameters of the information on performance executed by a third set of the plurality of applications.

\* \* \* \* \*